United States Patent [19]

Hunke

[11] 4,025,252
[45] May 24, 1977

[54] GRANULATING APPARATUS, ESPECIALLY FOR STRANDS OF THERMOPLASTIC MATERIALS

[75] Inventor: Friedrich Hunke, Grossostheim, Germany

[73] Assignee: Automatik Apparate-Maschinebau H. Hench GmbH, Grossostheim, Germany

[22] Filed: Jan. 22, 1976

[21] Appl. No.: 651,338

[30] Foreign Application Priority Data

Jan. 28, 1975 Germany ........................ 2503455

[52] U.S. Cl. .................................. 425/67; 425/71; 425/308
[51] Int. Cl.² .......................................... D06H 7/00
[58] Field of Search ................ 425/66, 71, 202, 70, 425/308, 67, 378 R, 378 S, 317, 294, 296

[56] References Cited

UNITED STATES PATENTS

| | | | |
|---|---|---|---|
| 1,060,122 | 4/1913 | Prosig | 425/308 X |
| 1,740,029 | 12/1929 | Moomy | 425/71 X |
| 2,739,546 | 3/1956 | Bonnafoux | 425/308 |
| 3,073,733 | 1/1963 | Mitchell | 425/71 X |
| 3,423,497 | 1/1969 | Arnold et al. | 425/308 X |
| 3,723,035 | 3/1973 | Franke | 425/308 X |

Primary Examiner—Robert L. Spicer, Jr.
Attorney, Agent, or Firm—W. G. Fasse; W. W. Roberts

[57] ABSTRACT

The present granulating apparatus is especially suitable for chopping strands or thermoplastic material into small pieces as the strands emerge from nozzles. For transporting these strands when they are still hot and partially liquid from the nozzles to a cutting apparatus, there is arranged a chute between the nozzles and a pair of feeding rollers just upstream of the cutting apparatus. The feeding rollers exert a slight pull on the strands. The chute has an entrance end or inlet and an exit end or outlet, as well as a chute path interconnecting said ends, said chute path protruding at least at said ends from a common plane defined by the nozzles and by said feeding rollers, whereby the strands are pressed against the chute at least at the chute ends. A housing surrounds the cutting roller. Cooling water supplied to the housing is divided into a main stream and into a water curtain. The water curtain is so located that the cut off granules must first pass through the curtain before contacting the housing. The main stream floats the granules out of the housing.

26 Claims, 12 Drawing Figures

GRANULATING APPARATUS, ESPECIALLY FOR STRANDS OF THERMOPLASTIC MATERIALS

BACKGROUND OF THE INVENTION

The present invention relates to a granulating apparatus, especially for strands of thermoplastic materials. The strands of thermoplastic materials emerge, still in a molten condition, from nozzles and into a transporting means provided with cooling water, which transports the strands to a cutting device, such as a cutting roller.

An apparatus of this type known from French Patent Publication No. 2,133,666. In the known apparatus, the still molten strands are supplied from above into a transport chute in such a manner that the chute intercepts the strands, whereby the latter are bent. Thus, the transport chute forms, so to speak, a support for the strands which deflects the latter from a substantially vertical direction into a substantially horizontal direction. At the end of the transport chute there is arranged a cutting mechanism. In the known apparatus it is necessary to carefully adjust the operational speed of the cutting mechanism relative to the supply speed of the strands, because due to the type of guiding provided for the strands, the pull exerted on the strands by the cutting mechanism tends to lift the strands off the bottom of the transport chute. Thus, the strands are lifted out of the cooling water, whereby the desired cooling effect is undesirably avoided. On the other hand, it is not desirable to supply the strands to the cutting mechanism at a too low speed because that would result in a jamming ahead or upstream of the cutting mechanism, whereby the strands would tend to follow a wavy path, and might thus come into contact with each other which is undesirable, since the consistency of the strands is still rather tacky, whereby the strands might stick to each other. Thus, the cutting mechanism must be constructed in such a manner that it is capable of receiving the strands in a manner which adapts itself automatically to the supply speed of the strands. The supply speed of the strands may vary considerably depending on the varying viscosity.

According to German Patent Publication No. 2,230,187 it is known to deflect the strands from a feed advance device comprising a pair of revolving conveyor bands by means of tilted baffle plates, which are sprayed with water, said deflection taking place in response to any trouble that might occur in the normal feed advance of the strands by the pair of revolving conveyor bands. Thus, in this prior art granulating apparatus for strands of thermoplastic material, said baffle plates become effective at any time when it is not desired to supply strands to the regular feed advance mechanism. No teaching can be taken from this reference with regard to the use of rigid transport chutes for interconnecting the nozzles and the feeding mechanism.

OBJECTS OF THE INVENTION

In view of the foregoing, it is the aim of the present invention to achieve the following objects singly or in combination:

to provide a transport mechanism in such a manner that the above drawbacks of the prior art are overcome, more specifically, that the strands will be pulled uniformly into the cutting mechanism without being pulled out of the cooling water;

to take advantage of the pull exerted on the strands by a pair of feeding rollers in such a manner that said pull will keep the strands against the bottom of the transport chute and thus within the cooling water flowing through the chute;

to efficiently and positively guide the strands along the bottom of the transport chute;

to efficiently cool the strands as they travel through the transport chute;

to provide means which guide the strands as they emerge from the nozzles onto the transport chute, or, if desired, to permit the strands, for example, at the beginning of a new run to first bypass the transport chute;

to provide for a continuous water overflow into the and down of the transport chute;

to make the transport chute adjustable in its angular position relative to the vertical and also in its extent by which the chute projects outside a line connecting the nozzle outlets and the feeding roller inlet gap to vary the pull applied to the strands;

to provide means which will enable the severing of an initial length of strands at the beginning of a new run so as to avoid granulating this initial length;

to provide means which will avoid any jamming of the nozzles by assuring a continuous transporting away of the strands even if one transport chute should be temporarily out of order;

to provide an efficient cooling of the thermoplastic material not only while the respective strands are being transported toward the cutting mechanism, but also immediately after the cutting; and to force the individual cut off granules to penetrate a water curtain and to then travel along in a further water flow.

SUMMARY OF THE INVENTION

According to the invention there is provided an apparatus for granulating strands, especially strands of thermplastic materials, wherein the strands emerge from nozzles or so called spinnerets in a still molten condition. The strands are then transported through one or two chutes to a cutting mechanism. A pair of feeding rollers is arranged just upstream of the cutting mechanism. The feeding rollers exert a small pull on the strands. The chute or chutes are arranged in such a manner that at least the inlet end and the outlet end project out of a plane which connects the outlets of the nozzles with the inlet gap between the two feed advance rollers. This projection of the chute assures that the slight pull exerted by this feeding rollers presses the strands against the bottom of the chute, thus keeping the strands within the water flowing down along the bottom of the chute. Thus, the feeding rollers cannot lift off the strands from the bottom of the chute. It has been found that it is immaterial whether there are certain variations in the emerging speed of the strands from the nozzles, because due to the continuously maintained slight pull the differences in the speed of emerging and the speed of pulling the strands into the gap between the two feeding rollers are compensated by a slight stretching of the strands. Thus, this stretching is continuously able to compensate for speed differences.

The projection of the transport chute between its inlet and its outlet, that is, downstream of the nozzles and upstream of the feeding rollers keeps the strands in forced contact with the bottom of the chute and such contact is interrupted only by the film of cooling water, whereby transversal, as well as longitudinal vibrations of the strands are prevented. It has been found that longitudinal vibrations of the strands are prevented, because of the friction between the strands and the bottom of the chute. Transversal vibrations in a plane extending perpendicularly to the chute cannot occur due to the pulling of the strands against the chute. Transversal vibrations in a plane extending parallel to the lateral extension of the chute are also prevented just as the above mentioned longitudinal vibrations, by the friction between the strands and the bottom of the chute. This mechanical stabilization of the travel of the strands achieved according to the invention has the advantage that the strands may run with rather close spacings between adjacent strands along the length of the chute and also in the feeding rollers. Surprisingly, the invention achieves a positive guiding of the still molten strands along a stationary chute which is supplied with cooling water between the nozzles or spinnerets and the pair of feeding rollers. Moreover, the chute and guiding may be compact since the strands may now be closely spaced, as mentioned above. Another advantage is seen in that rather simple means, namely, the protruding or projecting of the chute beyond a plane connecting the nozzles with the inlet gap of the feeding rollers results in the desired tensioning of the strands and the positive guide without overstretching the molten strands.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
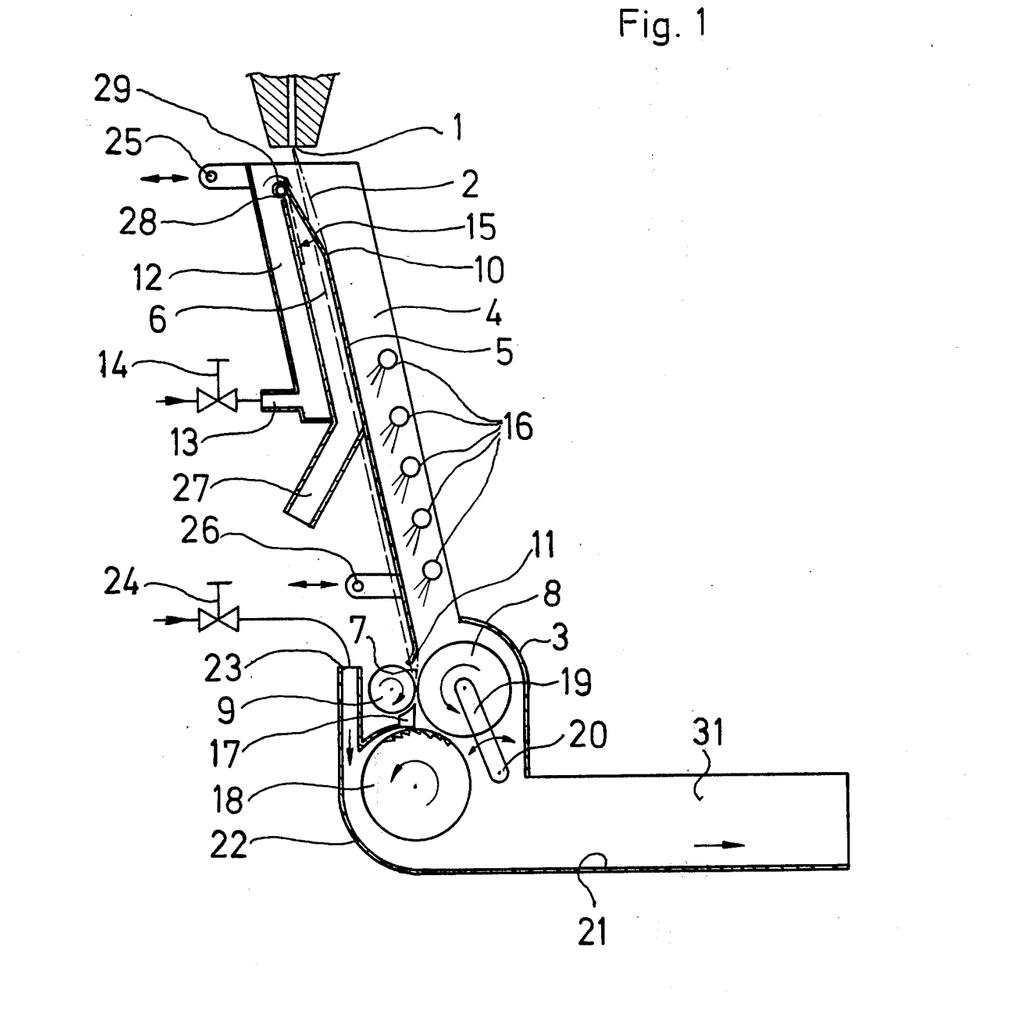
FIG. 1 is a side view, partially in section of one embodiment of the apparatus according to the invention.
Figure 5:
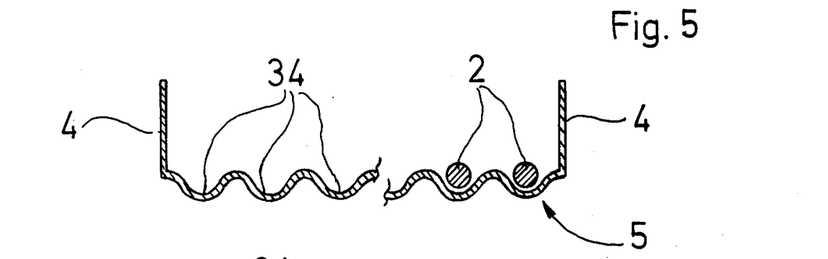
FIG. 5 is a sectional view through a chute provided with longitudinal grooves.

FIG. 1 shows a sectional side view of one embodiment of an apparatus according to the invention. Substantially vertically above the apparatus there is arranged a set of nozzles or spinnerets 1 for producing a plurality of strands 2 of thermoplastic material. The strands emerge from the nozzles while still in the molten state. The molten thermoplastic material is supplied to the nozzle by conventional means not shown, for example, an extruder. The strands 2 emerging from the nozzle 1 are shown by a dash dotted line in FIG. 1. The strands 2 are guided onto a transport chute 5 arranged substantially vertically and in a normally stationary position. The chute 5 has laterally extending side walls or edges 4. FIG. 1 illustrates a longitudinal section through the chute whereas FIG. 5 illustrates one example of a cross section through the chute, which may, for example, have a U-shaped cross section.

According to the invention the bottom of the chute 5 projects out of a plane or line 6 connecting the hole of a nozzle 1 with the gap 7 between the two feeding rollers 8 and 9 located between the downstream end 11 of the chute 5 and the cutting mechanism, such as a cutting roller 18. This raised bottom of the chute, so to speak, has the surprising advantage that it applies a certain tension to the strands thereby keeping the strands in contact with the bottom of the chute substantially along the entire length of the chute between its inlet end 10 and its outlet end 11. A slight bend is imparted to the strands 2 at the inlet point 10 of the chute 5. Similarly, a slight bend is imparted to the strands at the outlet end 11 of the chute 5.

Cooling water is supplied to the upper end of the chute 5 from a water box 12. The water box 12 is so positioned that the upper end 28 of its inner wall forms an overflow for the water in the box to flow down on to an incline or ramp 15 connecting the box to the chute. The box 12 has a water inlet port 13 connected to a water supply pipe by means of a valve 14 for controlling the water supply. The upper end of the inner box wall and the upper end of the ramp form the overflow at 28 as described. The overflow 28 acts as a dam so that the water is flowing in substantially uniform distribution and substantially without whirling over the entire width of the ramp 15 and thus uniformly down the chute 5. The downflowing cooling water thus envelopes the strands 2 while simultaneously forming a film between the bottom of the chute 5 and the strands. This has the advantage that the strands which are still practically in a substantially liquid state do not stick to the surface of the chute bottom. As the strands move through the water layer down the chute, they are being cooled efficiently so that at the outlet 11 of the chute 5, the strands are solidified at least to the extent that an outer skin of each strand is solidified.

A plurality of spray nozzles 16, for example, five of such spray nozzles are arranged in front of the chute 5 so as to face into the chute for supplying additional cooling water into the chute 5. This additional cooling water increases the cooling effect.

Upon leaving the outlet 11 of the chute 5, the strands 2 enter into the gap 7 between the feeding rollers 8 and 9, whereby these rollers exert a certain small pull on the strands, whereby the strands remain tight along the entire length of their travel from the nozzle 1 to the rollers 8, 9. Moreover, due to the projection as taught herein, of the chute bottom out of the plane 6 a positive guiding of the strands is accomplished, whereby vibrations or oscillations of the strands are prevented. The strand or strands are then advanced over the counter-edge 17 to a cutting device, such as a cutting roller 18, which chops up the strands into a granular material, as is well known.

The feeding roller 8 is rotatably secured to the free end of a lever arm 19 and rotates counter-clockwise. The lever arm 19 is journaled to an axis 20 for adjustment of the roller position. The lever 19 may be spring biased for pressing the roller 8 with a defined biasing force against the feeding roller 9 so that a predetermined friction is accomplished by means of the two feeding rollers 8 and 9. At least one of these rollers 8 and/or 9 is positively driven by well known means, not shown, for maintaining the above mentioned slight tension on the strand or strands.

The cutting roller 18 is supported in a receiving and discharge device for the granulated material. The device includes a housing 21 having a forward bend wall 22 which merges upwardly into a water inlet 23 and which merges rearwardly into a discharge chute 31. The water inlet 23 is connected to a water supply pipe through a control valve 24. The arrangement of the water inlet 23 relative to the counter-clockwise rotating cutting roller 18 is such that the cooling water flows tangentially past the cutting roller 18 and the granulated material is thrown into this stream of water. The bent portion 22 of the housing wall guides the water with the granulated material in the water past the cutting roller 18 and into the discharge chute 31. By controlling the water flow with the valve 24, it is possible to control the speed of the additional cooling water through the inlet 23 and thus the cooling of the granulated material as it is moved into the discharge chute 31. The cooling of the strands 2 depends on the water supply through the valves 14 and 23, as well as through the valves 14 and 23, as well as through the spray nozzles 16. Thus, it is possible to control the temperature of any strand as it is presented for cutting, as well as the temperature of the granular material, as it moves into the discharge chute 31 by adjusting the respective valves 14 and 22 and by adjusting the spray nozzles 16.

The construction of the housing 21 is preferably such that the bent portion 22 and the water inlet or nozzle portion 23 extend along the entire length of the cutting roller 18, whereby the portion 22 and the inlet 23 form a cooperating structure, which assures the tangential water supply relative to the cutting roller 18. Further, the water flow and the rotation of the cutting roller 18 are in the same direction at the point where the water contacts the roller. This feature has the advantage that the granular material is rapidly removed from the cutting roller 18. Incidentally, if desired, it is possible to directly connect the discharge chute 31 to a dryer for the granular material. As mentioned, the cooling in the housing 21 may be effectively controlled and due to the combined control of the valves 14, 24 and the spray nozzle 16, it is possible to control the temperature of the granulated material at the output end of the discharge chute 31 in a wide range of temperatures, as desired.

The cooling water flowing down the chute 5 passes into the gap 7 between the rollers 8 and 9 which are slightly pressed apart by the strands 2 so that the water may pass through the gap 7 to reach the cutting location where the roller 18 passes the counter-edge 17. This feature has the advantage that the water not only cools the strands, but also the counter edge 17 and the cutting teeth of the roller 18. A further advantage of this feature is seen in that the cutting noise is substantially reduced and dampened by the water. Moreover, the water at this point also substantially reduces the noise, which is normally present in this kind of apparatus prior to the actual cutting, that is, when the roller 18 rotates without actually cutting. Incidentally, the water will be removed from the housing 21 by conventional means.

It is an advantage of the invention to adjust the extent of the projection of the bottom of the chute 5 out of the plane 6 in order to control the tension applied to the strands 2. A larger projection increases the friction between the strands and the chute bottom and thus the tension and vice-versa, whereby the water film mentioned above, between the strands 2 and the chute 5, continuously prevents the sticking of the strand or strands to the surface of the chute 5. The increased friction has, among others, the advantage that a strand of a material having a low viscosity is not substantially stretched along its path down the chute 5. A too extensive stretching of the strand or strands is undesirable, since it might influence the quality of the granular material. Depending upon the type of material to be granulated, it may be desirable to adjust the extent of the projection of the chute 5 at its inlet 10 and/or at its outlet 11. Thus, it may be desirable to adjust the extent of the projection at each end to the same extent or to different extends.

In order to provide for such a flexible adjustment of the position of the chute 5, relative to the plane 6, the chute is pivotable about horizontally extending axes 25, 26, whereby these tilting axes may be simultaneously adjustable in a horizontal direction as indicated by the respective double arrows next adjacent to these axes 25 and 26. If the pivot axes 25, 26 are adjusted horizontally, for example, along suitable horizontally disposed guide rails, the extent of projection at the inlet 10 and at the outlet 11 will be the same. However, if the angular position of the chute 5 is adjusted by retaining one tilting axis 25 or 26 in a fixed position, and by respectively moving the other tilting axis, for example, along a cam track, the extend of projection at the inlet point 10 may be different from the extent of projection at the outlet point 11 and vice versa. By adjusting the angular position of the chute 5 relative to the vertical, it is possible to control the speed of the cooling water flowing down the chute. This feature also contributes to a fine control of the cooling effect. Such flow speed even contributes to the pull applied to the strands, which further facilitates the prevention of strand vibrations. The extent of the projection of the chute as described above relative to the plane 6 also contributes to controlling the pull applied to the strands and the described adjustment makes it possible to vary such pull. The described possibilities of adjustment are especially significant where relative thick strands from a melt of a low viscosity material are to be exposed to a strong stream or flow of cooling water. Under these operating conditions the tension applied by the adjustment of the chute itself may be controlled to such an extent as to counteract any lifting effect which a strong flow of cooling water might have on the strands. Incidentally, the details of the horizontal and angular adjustment means for the chute are not shown, since such means are well known in the art, for example, in the form of screw adjustments, cam tracks and guide tracks.

At the beginning of the spinning process, the strands emerging from the nozzle or spinneret 1 may be not homogenous or non-uniform and it may not be desirable to immediately begin the cutting of the strands but to first discharge a certain length of strands before beginning with the cutting. This may also be desirable in order to avoid the mixing of granulated material in the housing 21 having a proper consistency with granulated material stemming from an initial length of strands, which might not be uniform. In order to discharge an initial length of strands either at the beginning of a new run or at any time during a run, there is provided according to the invention, a ramp 15 which forms the upper part of the chute 5. The upper end of the ramp 15 is hinged at 29 to the upper end of the inner wall of the water box 12. The lower free end of the ramp 15 contacts the inlet end 10 of the chute 5 in the position shown in full lines in FIG. 1, in which the ramp 15 guides the strands 2 onto the chute 5. The dashed line position illustrates the ramp 15 in the tilted back position, thereby opening a free space or channel 27 into which the undesired length of strands may move. Any conventional severing means may be employed to sever the strands and it is even possible that the tilting back of the ramp 15 might sever the strands when the free edge of the ramp 15 contacts the inlet edge 10 of the chute 4. In this manner it is possible to eliminate any strands 2 emerging from the spinnerette 1 which might initially be too thick so that the initial length of strands would interfere with the proper pulling of the strands into the gap between the feeding rollers 8 and 9. As soon as the ramp 15 returns into its full line position, it will guide the strands onto the chute 5.

It will be noted that the hinge 29 functions simultaneously as a dam for the water in the box 12. In the dashed line open position of the ramp 15, the water might escape through the channel 27, however, as soon as the ramp 15 returns into the full line position, the water will again be guided over the dam formed by the hinge 29 and onto the chute 5. The ramp 15 will be returned into its closed or working position as soon as the strands emerging from the spinneret 1 have the desired shape or uniform thickness. In the closed position the ramp 15 guides the strands properly into the chute 5. The provision of the tiltable ramp 15 has the further advantage that any time during the operation of the apparatus, a certain length of strand may be removed either for test purposes or when troubles might occur in the uniformity of the strands or the like. In these situations, it would not be desirable to feed the strands through the gap between the feeding rollers 8 and 9 and to the cutting roller 18 and the tiltable ramp 15 is an efficient and simple expedient for the just described purposes.

Figure 2:
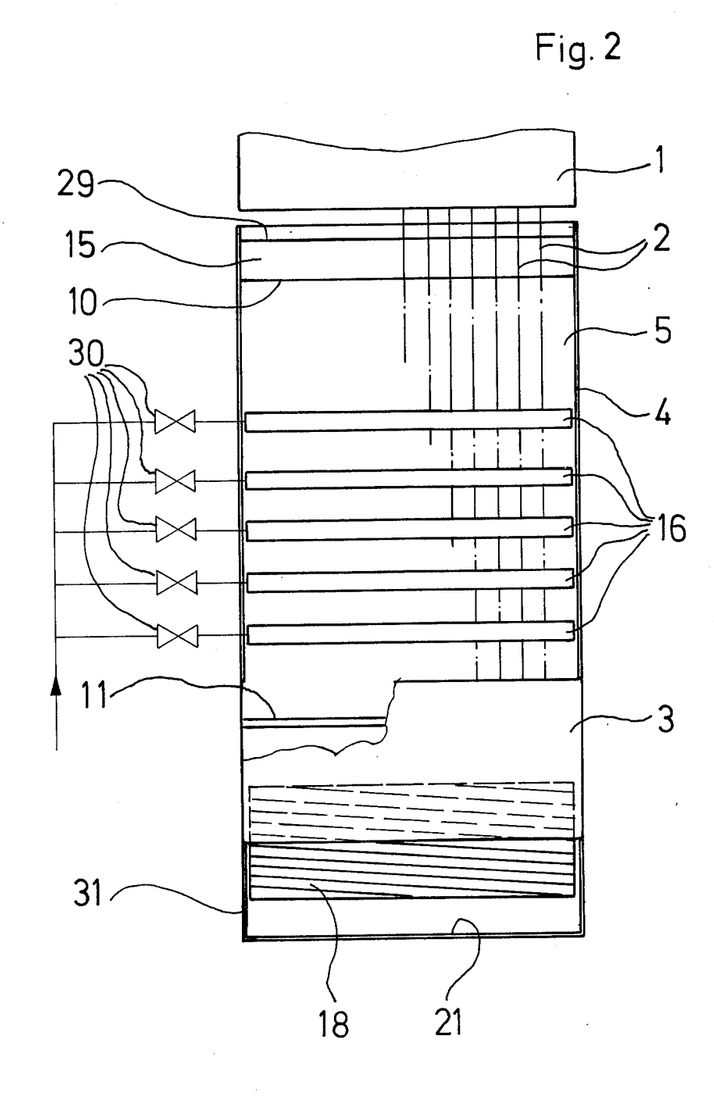
FIG. 2 shows a front view of the apparatus according to FIG. 1.

FIG. 2 shows the basic illustration of the apparatus according to FIG. 1 in a front view. It will be noted that a plurality of strands 2 emerge from the spinneret 1. Depending on practical requirements, the width across the chute 5 may vary depending on the width of the nozzle or spinneret 1. However, it will normally be desirable to granulate as large a number of strands simultaneously as possible. FIG. 2 shows that the strands 2 are all bent as they contact the inlet end 10 of the chute 5 and that the strands then travel along the bottom of the chute below the spray nozzles 16 downwardly. Below the exit end 11 of the chute the strands are taken up by the feeding rollers 8 and 9 in the housing 3. The lateral side walls 4 of the chute 5 extend along the entire length of the chute and keep the cooling water in the channel of the chute. The chute with its side walls 4 extends into the housing 3 which merges into the housing 21 of the receiving and discharge chute 31.

Figure 3:
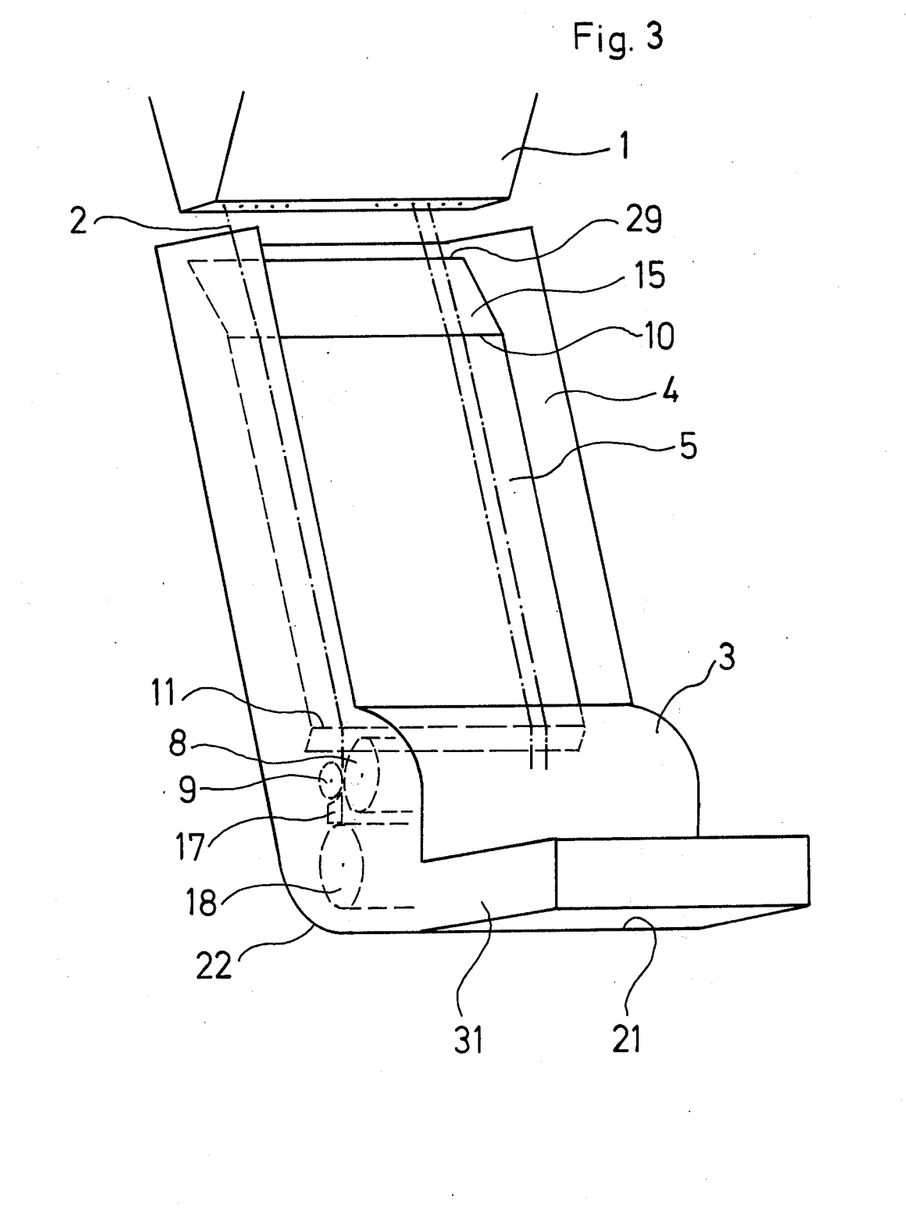
FIG. 3 illustrates a perspective view of the apparatus of FIGS. 1 and 2.

FIG. 3 shows the apparatus of FIGS. 1 and 2 in a perspective view. It is to be noted how the strands 2 are guided downwardly along straight lines and in contact with the chute 5 between the inlet 10 and the outlet 11.

The granulated material emerges from the lower end of the housing 21.

Figure 4:
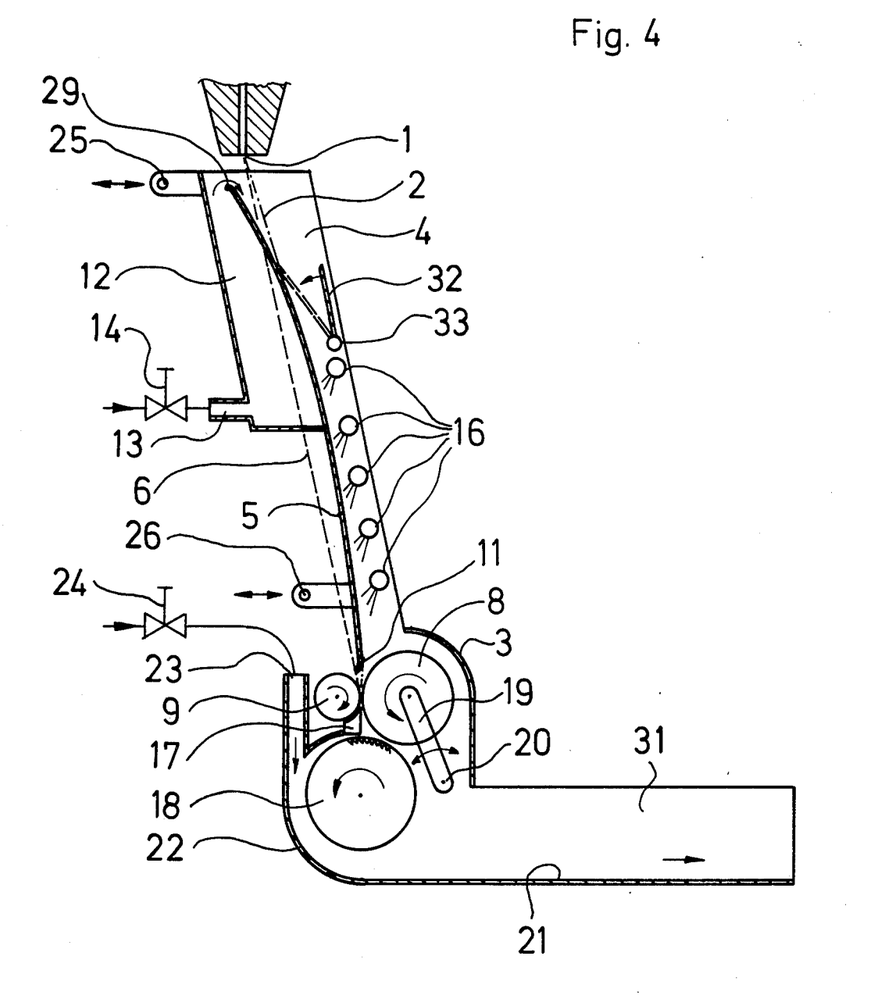
FIG. 4 illustrates a sectional view through a modified embodiment of the apparatus according to the invention.

FIG. 4 illustrates a view similar to that of FIG. 1, however, showing a modified version of the chute bottom, which in FIG. 4 is convex relative to the strands 2. This feature has the advantage that a uniform pressure is exerted on the downwardly moving strands along their entire length contacting the chute bottom. In this manner an increased friction is accomplished between the strands 2 and the bottom of the chute 5, as compared to the embodiment of FIG. 1. Such an increased friction is desirable especially in connection with certain types of materials and it improves the guiding of the strands along the bottom of the chute 5.

In order to provide in FIG. 4 the possibility of deflecting any desired length of strands, for example, at the beginning of a new run as described above with reference to the ramp 15 in FIG. 1, there is provided in FIG. 4, a deflection flap 32 hinged at 33 for movement into a full line strand passing position or into a dashed line strand intercepting position. When the flap 32 is in the dashed line position, it will prevent the strands from moving down the chute and into the gap 7 between the feeding rollers 8 and 9.

The bottom of the chute 5 may in both embodiments of the invention be smooth, whereby the tension applied to the strands by the feeding rollers 8 and 9 is sufficient to keep each moving strand on a straight line. However, if it is desired to space the strands as closely as possible in order to make efficient use of the surface area of the chute or where it is desired to maximize the granulating capacity of the apparatus, which also requires a close spacing of the strands, it is suitable to provide the bottom of the chute with longitudinal grooves, which improve the guiding of the strands. If the grooves are used, they should be provided in any event at the inlet end 10 and at the outlet end 11, where the strands are pulled against the chute as they emerge from the nozzles 1 and as they are drawn into the gap between the feeding rollers 8 and 9. FIG. 5 shows a cross section through a chute 5 with grooves 34 in the bottom of the chute. The chute could be made of a corrugated material having flat edges forming the vertical side walls 4 of the chute 5. Each strand 2 is located in its respective groove 34. Such grooves 34 may be provided in chutes which extend substantially along a straight line as shown in FIG. 1 and also in the type of chute which is convex as shown in FIG. 4.

Figure 6:
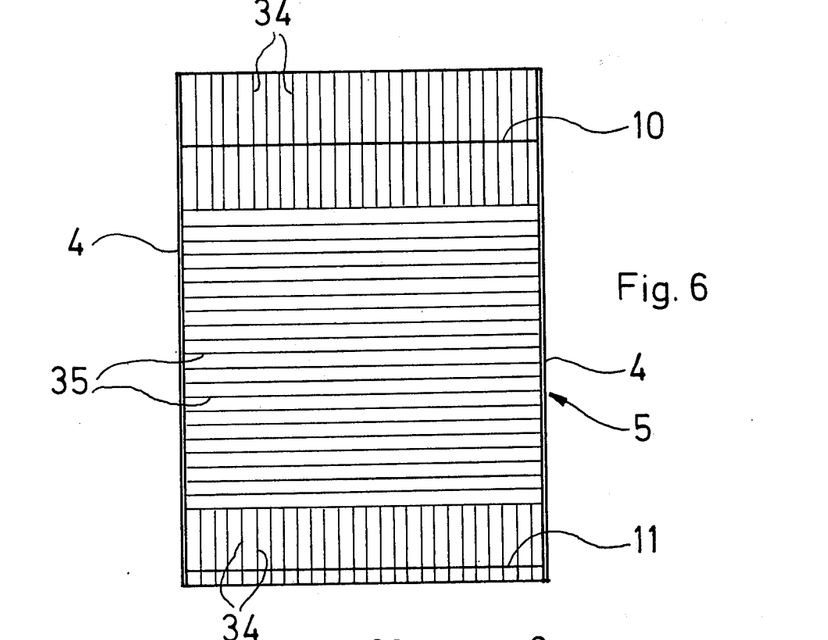
FIG. 6 is a top plan view onto a chute provided with longitudinal, as well as with cross-wise grooves.

For certain purposes it may be desirable to control the flow speed of the cooling water down the chute in order not to exert too strong a pull on the strands by the downflowing water. This may be desirable where the strands are made of a material having a low viscosity. For this flow speed control of the cooling water, there are shown in FIG. 6 cross grooves 35, which extend from one side wall 4 to the other side wall 4. The longitudinal grooves 34 extend in the ramp 15 as well as over the inlet end 10 partly down the chute. The longitudinal grooves also extend over part of the outlet end 11 of the chute including the downwardly bent portion at the very end of the chute 5. The cross grooves 35 impede the downflow of the cooling water, whereby the water flow becomes turbulent. Such turbulent flow of the cooling water increases on the one hand the cooling effect and on the other hand it diminishes the downflow speed, whereby the pull of the water on the strands is reduced.

Figure 7:
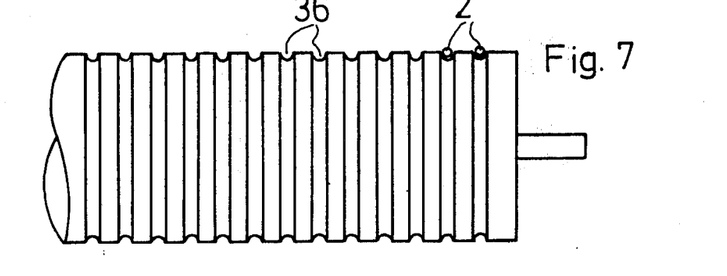
FIG. 7 is a side view of one of the feeding rollers provided with circumferential grooves.
Figure 8A:
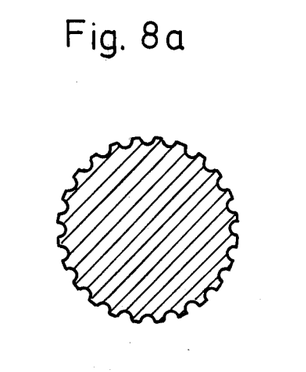
FIGS. 8a and 8b illustrate feeding rollers with longitudinally extending grooves.
Figure 8B:
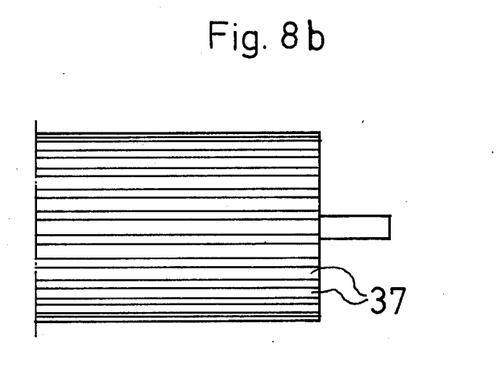

FIG. 7 illustrates one of the feeding rollers 8 or 9 provided with circumferential grooves 36, which improves the guiding of the strands 2, especially immediately adjacent to the cutting roller 18. At least one of the feeding rollers 8 or 9 should be provided with such guiding grooves 36. Furthermore, it is possible to provide at least one of the feeding rollers with longitudinal grooves 37 as shown in FIGS. 8A and 8B. If both types of grooves in the feeding rollers are to be used, it is preferable to provide one feeding roller with circumferential grooves and the other with longitudinal grooves to facilitate the drawing of the strands into the space between the two feeding rollers. This may be especially advantageous where thick strands are to be granulated or where the leading ends of a new run of strands is rather thick. Incidentally, the circumferential grooves, as shown in FIG. 7, assure an especially good lateral stability of the strands. The circumferential grooves could be arranged in one or both rollers 8 and/or 9.

For certain purposes it may be desirable to provide the longitudinal grooves 37 shown in the sectional view of FIG. 8a and in the side view of FIG. 8b in one and/or both rollers 8, 9. The ability to pull the strands through the gap between the two rollers is best when both rollers are provided with the longitudinal grooves 37.

Figure 9:
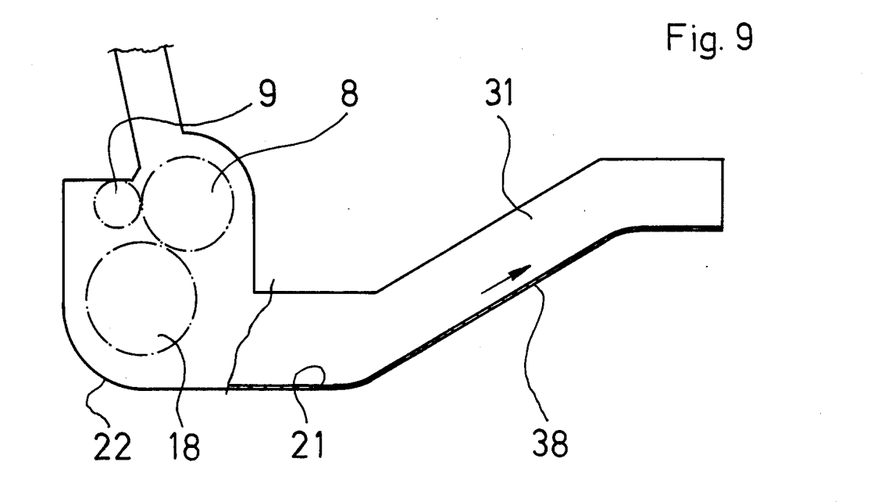
FIG. 9 illustrates a receptacle for the granulated material, said receptacle having an angularly disposed discharge chute.
Figure 10:
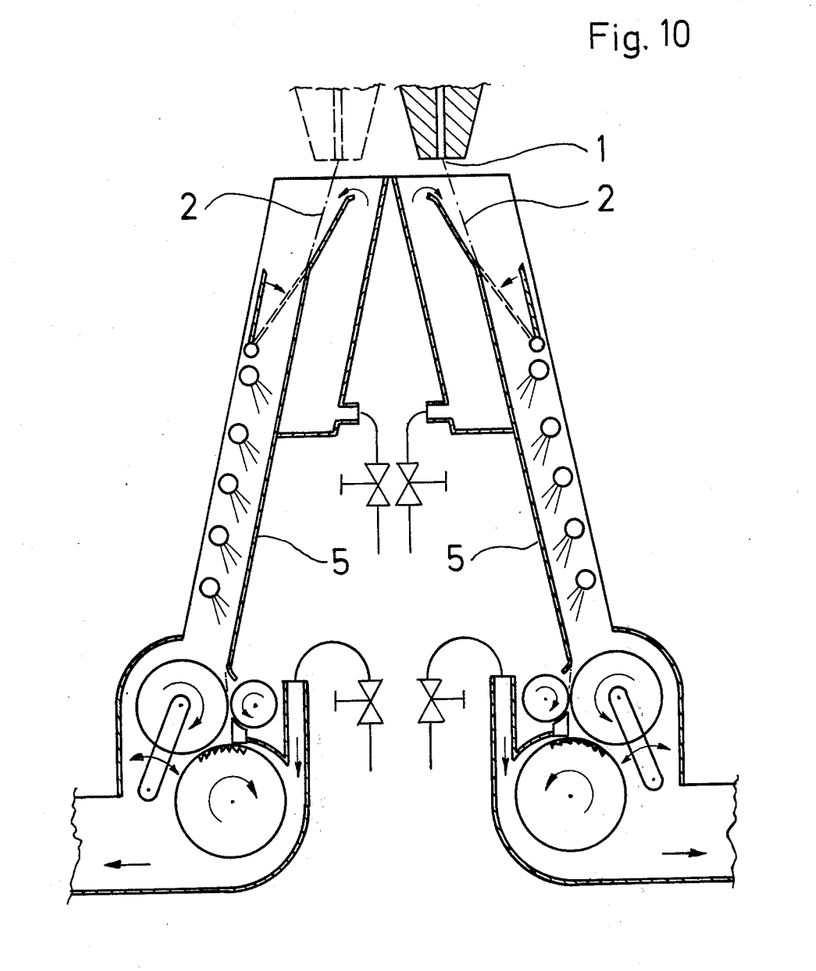
FIG. 10 illustrates two arrangements located mirror-symmetrically relative to each other.

FIG. 9 illustrates somewhat schematically, a side view of a receiving and discharge chute 31 having a housing 21 with an upper housing member 3 and an upwardly bent lower housing wall 22. In the embodiment of FIG. 10 the housing includes a discharge chute with an upwardly inclined section 38, which may be desirable for space saving purposes. Normally, the kinetic energy of the additional cooling water supplied to the water inlet 23, as described above with reference to FIGS. 1 to 3, is sufficient to transport the granulated material up the incline 38 and out of the discharge chute 31.

Referring to FIG. 10, it will be noted that the apparatus according to the invention is constructed in such a manner that two of the present devices may be arranged in a mirror-symmetrical fashion relative to each other. This feature may be used to increase the throughput capacity. It may also be advantageous to use this arrangement for avoiding the interruption of the flow of the melt out of the nozzles 1. Such interruption may be undesirable, since the operation is normally accompanied by chemical reactions which should not be interrupted and an interruption might also mechanically clog the fine passages through the nozzles. Thus, the nozzles may be arranged for shifting from a position feeding into the right hand chute as shown in full lines in FIG. 10 to a position for feeding into the left hand chute as shown in dashed lines in FIG. 10.

Two straight stationary chutes 5 are employed in FIG. 10 and it will be noted that the upper end of each chute is bent inwardly into a water container so that the upper end forms the water dam as previously described. Further, a flap arrangement is shown in FIG. 10, which has been described in more detail above with reference to FIG. 4. The mirror-symmetrical arrangement of two units provides a compact construction and where the interruption of a flow is of no concern, each unit would be cooperating with its respective nozzle 1. However, as mentioned, where clogging is to be avoided, one set of nozzles would be arranged for cooperation with two units, as shown in FIG. 10. Where one nozzle or set of nozzles cooperates with two chutes, as shown in FIG. 10, the continuous operation of the nozzles is assured, which might be important for certain chemical processes. It was mentioned above that the nozzles might be shifted relative to the chutes. However, for practical reasons, it may be preferable to keep the nozzles stationary and shift the unit with two chutes 5 relative to the nozzles, for example, along rails.

Figure 11:
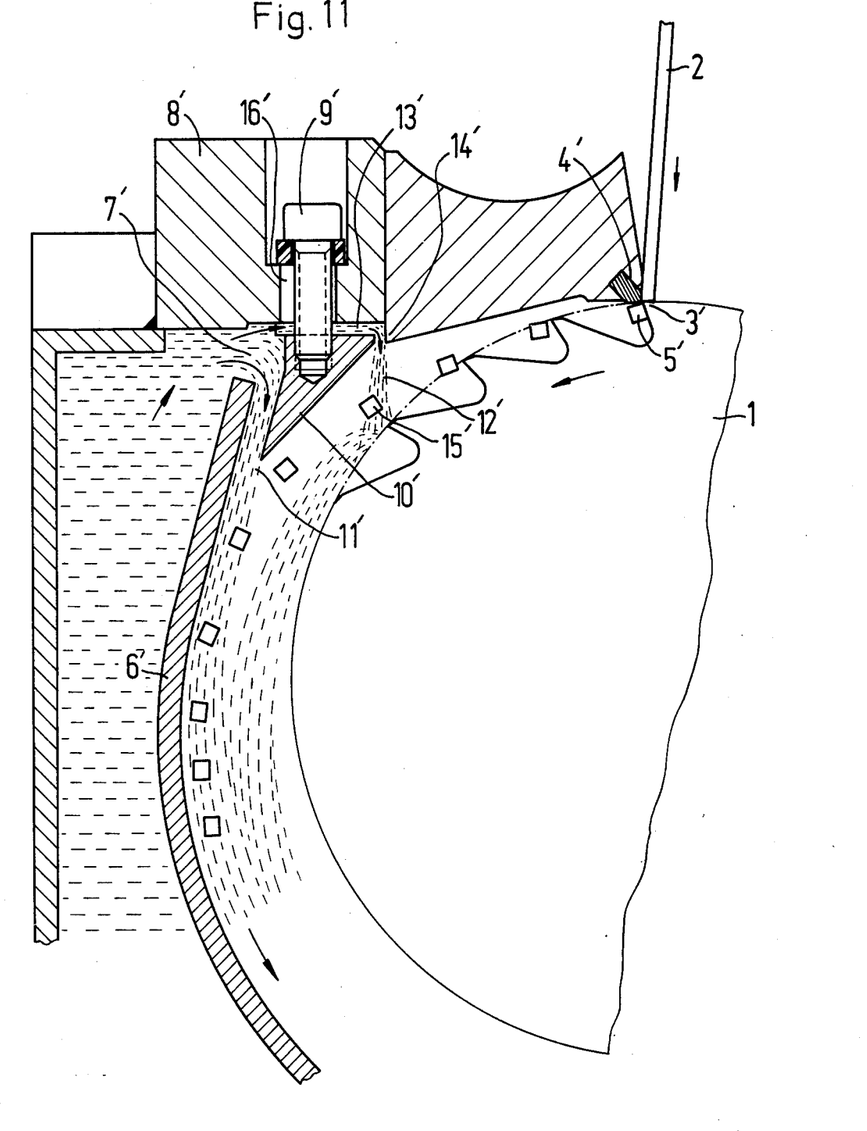
FIG. 11 shows the cooling water supply to the cutting roller according to the invention.

FIG. 11 illustrates an embodiment of the invention for increasing the efficiency of the cooling water supplied through the inlet 23 as described above with reference to FIG. 1. FIG. 11 shows the cutting roller in an end view and the remainder in a sectional view. The strand 2 is supplied to the cutter at a cutting location 3' formed between the counter edge 4' and the teeth of the cutting roller 18. As the cutting roller 18 rotates counter-clockwise, each tooth chops off a granule 5' and propells it in a substantially tangential direction. A housing wall 6' forms with its upper end a dam over which the water from the inlet 23 flows as shown in FIG. 11. The upper edge of the wall 6' forms a gap 7' which extends along the entire length of the cutting roller 18. Above the gap 7' there is arranged a supporting bar 8' which confines the gap 7' at its upper edge and which supports the counter edge 4'. The bar 8', the counter edge 4', and the housing wall 6' are all supported by or in the housing of the receiving and discharge device.

A water flow dividing bar 10' is adjustably secured to the support bar 8' by means of adjusting screws 9'. The counter edge and the support bar 8' form a corner 14'. The dividing bar 10' is located in such a position relative to the gap 7' and relative to the corner 14' that it divides the water flowing through the gap 7' into a main stream 11' and into a water curtain 12' deflected by the corner 14'. The main stream 11' flows substantially in a tangential direction relative to the cutting roller 18 to float the granules 5' into the discharge chute. The water curtain 12' is formed due to the channel 13' located between the upper surface of the dividing bar 10' and the lower surface of the supporting bar 8'. The corner 14' is located in such a position that the water curtain 12' is deflected toward the cutting roller 18 in such a location that the granules 5' must first penetrate the water curtain 12' before they contact any other elements in the structure. Thus, as shown in FIG. 11, the granule 15' just penetrates the water curtain 12' whereby the granule is enveloped all around by a water film which reduces the tackiness of the granule and thus prevents their sticking to the wall of the structure, for example, housing wall 6'. The location of the water curtain 12' is so close to the cutting position 3' that the granules must first penetrate through the water curtain before contacting any other surfaces.

The adjustment screw 9' permits varying the position of the dividing bar 10' within certain limits to thereby adjust the width of the channel 13'. Moreover, the hole 16' in the bar 8' through which the screw 9' extends is large enough to permit a horizontal adjustment of the dividing bar 10', whereby upon loosening of the screw 9' the dividing bar 10' may be shifted horizontally to vary the width of the main water stream 11', whereby simultaneously also the spacing of the upper right hand edge of the dividing bar 10' from the corner 14' is changed to thereby vary the width of the water curtain 12'. Depending on the width or length of the cutting roller 18, the dividing bar 10' will have a corresponding length and it may be supported by a plurality of adjustable screw means 9'. From the just described adjustment of the dividing bar 10' it will be appreciated that a narrowing of the main stream 11' will result in a widening of the width of the water curtain 12' and vice versa. The upper surface of the dividing bar 10' rests against the lower surface of the supporting bar 8' by means of spacer washers or the like which could, for example, be made of compressible hard rubber or the like. These spacers are not shown for simplicity's sake in the sectional view of FIG. 11.

A further advantage of the water curtain 12' resides in the reduction of noise, since the water curtain 12' separates the noise generating source, namely, the cutting position 3' from the remainder of the housing and from the exits of the housing. The just described embodiment of FIG. 11 achieves two purposes. On the one hand the granular material is rapidly floated away by the main water stream 11 flowing tangentially relative to the cutting roller 18. On the other hand, the water curtain 12', which is directed onto the cutting roller 18' close to the cutting position assures that the granular material must penetrate the cooling water before it can contact any other elements in the structure. This is advantageous because at this point the granules are still sticky to some extent and the enveloping water film prevents their sticking to the housing walls. Besides, the water dividing bar 10' is of simple construction and easily adjusted as described.

Preferably, the water dividing bar 10' has a wedge shaped cross section, whereby the tip of the wedge points in the direction of the main water stream 11' and whereby the top surface of the wedge faces the supporting bar 8' with a spacing therebetween to form the channel 13' for the water curtain 12'. The arrangement of the elements relative to each other must be such that the corner or shoulder 14' can deflect the water curtain 12' in the described manner.

Although the invention has been described with reference to specific example embodiments, it is to be understood, that it is intended to cover all modifications and equivalents within the scope of the appended claims.

I claim:

1. In a granulating apparatus, especially for strands of thermoplastic materials, wherein the strands are extruded in a molten state from nozzle means, and including transport means in which the strands are cooled by water and transported to a cutting means, said transport means defining a feed advance direction, the improvement comprising a pair of strand feeding rollers defining a gap therebetween and being located between said cutting means and said transport means for exerting a pull on said strands, said nozzle means and the gap between said feeding rollers defining a common plane, said transport means comprising chute means having an inlet end adjacent to said nozzle means and an outlet end adjacent to said gap between said strand feeding rollers, the inlet and outlet ends of said chute means projecting from said common plane in a direction to deflect the strands from said common plane whereby the strands are urged against the inlet end as well as against the outlet end of the chute means by the pulling force of said feeding rollers.

2. The apparatus according to claim 1, wherein said chute means has a bottom, said bottom having a convex surface between said inlet end and said outlet end, said convex surface facing said strands as they travel in said feed advance direction lengthwise through the chute means.

3. The apparatus according to claim 1, wherein said chute means has a bottom, said bottom having longitudinal grooves for guiding said strands in said feed advance direction.

4. The apparatus according to claim 1, wherein said chute means has a bottom, said bottom having a central portion provided with grooves extending across said feed advance direction.

5. The apparatus according to claim 1, wherein at least one of said pair of strand feeding rollers comprises circumferential grooves in its surface for guiding said strands.

6. The apparatus according to claim 1, wherein at least one of said pair of strand feeding rollers comprises longitudinal grooves extending across said feed advance direction for positively pulling the strands.

7. The apparatus according to claim 1, further comprising a ramp arranged between said inlet end of the chute means and said nozzle means, said apparatus further comprising hinge means located outside of said common plane opposite said chute means, said ramp being hinged to said hinge means so that the ramp may be tilted from a chute inlet end contacting position into an open position away from said chute means through said common plane opposite said chute means.

8. The apparatus according to claim 7, further comprising a free space below said chute means, said hinged ramp in its open position permitting the strands to move into said free space.

9. The apparatus according to claim 1, further comprising a cooling water container arranged adjacent said inlet end of said chute means, said container having an upper overflow edge located so that water from said container may flow onto the chute means, and water supply means connected to said container for continuously filling said container with water when said apparatus is in operation.

10. The apparatus according to claim 1, further comprising spray nozzles arranged to face the strands in the chute means for spraying cooling water onto said strands as they travel along the chute means.

11. The apparatus according to claim 1, wherein said chute means extends at an angle relative to the vertical, said apparatus further comprising means connected to said chute means for adjusting the angular position of said chute means relative to the vertical.

12. The apparatus according to claim 1, further comprising means operatively connected to said chute means for adjusting the extent to which the chute means, especially the chute inlet and outlet ends are projecting away from said common plane.

13. The apparatus according to claim 12, wherein said chute adjusting means comprise an upper journal axis and a lower journal axis connected to said chute means, and means for separately adjusting the horizontal position of said upper and lower journal axes.

14. The apparatus according to claim 1, further comprising reception and discharge means arranged below said cutting means, said reception and discharge means having a housing surrounding at least a portion of said cutting means, and water supply means connected to said housing for supplying water into said housing between said cutting means and said housing.

15. The apparatus according to claim 14, wherein said housing has a bottom wall, and wherein said cutting means is a cutting roller, said bottom wall extending upwardly around said cutting roller, said water supply means being connected to said housing in such a position that the water is supplied into the housing tangentially relative to said cutting roller and in the direction of rotation of said cutting roller.

16. The apparatus according to claim 14, wherein said reception and discharge means is connected to feed the granulated material into drying means.

17. The apparatus according to claim 14, wherein said reception and discharge means comprise a channel including a portion having a rising angular disposition.

18. The apparatus according to claim 14, wherein said water supply means comprise control means for controlling the speed of the cooling water supplied into said reception and discharge means.

19. The apparatus according to claim 1, further comprising strand deflecting flap means arranged upstream of said strand feeding rollers, said flap means having a first position in which the flap means prevent strands from travelling along the chute and a second position in which the strands may freely travel along the chute.

20. The apparatus according to claim 1, wherein said chute means comprise two chutes arranged mirror-symmetrically relative to each other.

21. The apparatus according to claim 1, wherein said cutting means comprise a cutting roller, said apparatus further comprising a housing surrounding said cutting roller, said housing having a gap therein extending in said housing alongside said cutting roller at a position downstream of and adjacent to a cutting location, water supply means operatively connected to said gap in said housing, and a dividing bar located in said housing to extend alongside said gap, said dividing bar separating the water flowing through said gap into said housing, into a main water stream, and into a water curtain falling toward said cutting roller downstream of said cutting location so that cut off strand pieces must first penetrate said water curtain.

22. The apparatus according to claim 21, wherein said dividing bar has a substantially wedge shaped cross section whereby the tip of the bar points in the direction of said main water stream, said bar having a front face facing said main water stream to deflect the latter downwardly, said housing forming a corner alongside said gap, said bar having a top surface substantially opposite said tip, and means securing said dividing bar to said housing, but spaced from the housing and from said corner so that said top surface forms a channel with said housing, said channel extending into said corner whereby the corner deflects said water curtain in the desired direction toward the cutting roller.

23. The apparatus according to claim 22, wherein said securing means are adjustable to vary the spacing between the surfaces of the dividing bar and the housing.

24. In a granulating apparatus, wherein strands of a thermoplastic material are extruded in a molten state from nozzle means, and including transport means in which the strands are cooled by water and transported to a cutting means, said transport means defining a feed advance direction, the improvement comprising a pair of strand feeding rollers located between said cutting means and said transport means for exerting a pull on said strands, the gap between said feeding rollers and said nozzle means defining a common plane, said transport means comprising guiding means having a guiding surface for guiding said strands, said guiding surface having an inlet end adjacent to said nozzle means and an outlet end adjacent to said strand feeding rollers, said guiding surface, adjacent both said inlet and outlet ends thereof, being displaced from and facing away from said common plane, whereby said strands are deflected from said common plane and are urged against said inlet end and outlet end of said guiding means by the pulling force of said feeding rollers.

25. The granulating apparatus according to claim 24, wherein said guiding surface projects across said common plane between said inlet end thereof and said nozzle.

26. The granulating apparatus according to claim 24, wherein said guiding surface is spaced from said common plane for substantially the entire distance between said nozzle and said feeding rollers.

* * * * *

UNITED STATES PATENT OFFICE
CERTIFICATE OF CORRECTION

Patent No. 4,025,252          Dated May 24, 1977

Inventor(s) Friedrich Hunke

It is certified that error appears in the above-identified patent and that said Letters Patent are hereby corrected as shown below:

[30]   Foreign Application Priority Data

Jan. 28, 1975     Germany   25 03 455

Jan. 2, 1976      Germany   26 00 078

Signed and Sealed this ninth Day of August 1977

[SEAL]

Attest:

RUTH C. MASON
Attesting Officer

C. MARSHALL DANN
Commissioner of Patents and Trademarks